US00RE36652E

United States Patent [19]

Wang

[11] E Patent Number: Re. 36,652

[45] **Reissued Date of Patent: *Apr. 11, 2000**

[54] LATCH ASSEMBLY

[75] Inventor: William S. Wang, Marina Del Ray, Calif.

[73] Assignee: Eaton Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/695,858

[22] Filed: Aug. 9, 1996

Related U.S. Patent Documents

Reissue of:

[64] Patent No.: 5,244,239
Issued: Sep. 14, 1993
Appl. No.: 07/960,901
Filed: Oct. 14, 1992

[51] Int. Cl.[7] ..... E05B 47/00

[52] U.S. Cl. ..... 292/201; 292/341.16; 292/129

[58] Field of Search ..... 292/144, 129, 292/229, 201, 251.5, 341.16, 352, 56, 126, 120, 341.17

[56] References Cited

U.S. PATENT DOCUMENTS

| | | | |
|---|---|---|---|
| 3,635,511 | 1/1972 | Waller | 292/229 X |
| 3,658,370 | 4/1972 | Wang | 292/252 |
| 3,751,086 | 8/1973 | Geringer | 292/144 |
| 3,764,172 | 10/1973 | Standke | 292/252 |
| 3,918,751 | 11/1975 | Blake | 292/126 |
| 3,942,828 | 3/1976 | Bourrie et al. . | |
| 4,071,271 | 1/1978 | Bourrie et al. . | |
| 4,111,473 | 9/1978 | Bourrie et al. | 292/201 X |
| 4,182,539 | 1/1980 | Busch | 292/144 X |
| 4,824,151 | 4/1989 | Tayor | 292/341.16 X |
| 4,848,810 | 7/1989 | Gosse et al. | 292/129 |
| 5,127,691 | 7/1992 | Herron et al. | 292/144 X |

FOREIGN PATENT DOCUMENTS

| | | |
|---|---|---|
| 2268141 | 11/1975 | France . |
| 2319758 | 2/1977 | France . |
| 2359268 | 2/1978 | France . |

*Primary Examiner*—Darnell M. Boucher
*Attorney, Agent, or Firm*—Tarolli, Sundheim, Covell, Tummino & Szabo LLP

[57] ABSTRACT

A latch assembly includes a permanent magnet which is fixedly connected with a housing. A pair of pole pieces are connected with opposite poles of the permanent magnet. A coil extends around a portion one of the pole pieces. A keeper is mounted for pivotal movement between an initial position in which the keeper engages both of the pole pieces and a release position in which the keeper is spaced from the pole pieces. The coil is energizable to oppose the permanent magnet and release the keeper for pivotal movement from the initial position to the release position. A retainer surface is connected with the keeper and retains a striker and door against movement relative to the housing when the latch assembly is in an engaged condition. The retainer surface and striker cooperate to transmit force along a path which extends through an axis about which the keeper pivots. The retainer surface has an arcuate surface area with a center of curvature disposed on the axis about which the keeper pivots.

18 Claims, 7 Drawing Sheets

LATCH ASSEMBLY

Matter enclosed in heavy brackets [ ] appears in the original patent but forms no part of this reissue specification; matter printed in italics indicates the additions made by reissue.

BACKGROUND OF THE INVENTION

The present invention relates to a latch assembly which is used to retain a door against movement relative to a housing.

A latch assembly constructed in accordance with the present invention may be used in many different environments. However, the latch assembly is particularly well suited for use in association with a container which holds oxygen masks for aircraft passengers. Although the container may have many different locations in an aircraft, it is commonly located above a passenger seat on the lower side of an overhead luggage compartment. When aircraft operating conditions make it advisable for passengers to be able to use oxygen, a door on each of the oxygen mask containers swings downwardly to deploy the oxygen masks.

Known latch assemblies for use in association with containers for holding oxygen masks for aircraft passengers are disclosed in U.S. Pat. Nos. 3,658,370 and 3,764,172. These latch assemblies include a permanent magnet which retains the latch assembly in an engaged condition. When the oxygen masks are to be deployed, a coil is energized to oppose the permanent magnet. This results in actuation of the latch assembly to release a striker connected with the door. When the striker connected with the door is released, the door swings open and the oxygen masks are deployed.

The latch assemblies disclosed in the aforementioned patents have been generally satisfactory in their mode of operation. However, due to the substantial number of latch assemblies used on relatively large passenger aircraft, it is desirable to minimize the weight of each latch assembly. In order to be certain that the latch assemblies will not become disengaged and deploy oxygen masks in a manner which would unnecessarily alarm passengers when an aircraft encounters relatively large operating forces during normal operating conditions, the latch assembly should be capable of retaining the oxygen mask container door in a closed condition when the aircraft is subjected to operating forces which are several times the force of gravity.

SUMMARY OF THE INVENTION

The present invention provides a new and improved assembly for retaining a door against movement relative to a housing. The assembly includes a striker which is connected with the door for movement therewith relative to the housing. A latch assembly is connected with the housing to hold the striker and door against movement relative to the housing and to release the striker and door for movement relative to the housing.

The latch assembly includes a permanent magnet which is fixedly connected with the housing. A coil extends around a pole piece connected with the permanent magnet. A keeper is mounted for pivotal movement between an initial position in which it engages the pole piece and a release position in which the keeper is spaced from the pole piece.

A retainer surface is connected with the keeper to retain the striker when the keeper is in the initial position. The retainer surface is preferably pivotal with the keeper. Thus, the retainer surface is pivotal between a retaining position in which it retains the striker and door against movement relative to the housing and a release position in which the retainer surface is ineffective to retain the striker against movement to thereby release the door.

The striker includes a surface which cooperates with the retainer surface to transmit, force between the striker and latch assembly when the keeper is in the initial position. The force transmitted between the striker surface and the retainer surface is advantageously along a path which extends through an axis about which the keeper pivots. This minimizes any tendency for the force transmitted between the striker and the latch assembly to pivot the keeper from the initial position to the release position.

Although the retainer surface may have many different configurations, in one specific embodiment of the invention, the retainer surface had an arcuate configuration with a center of curvature disposed on the axis about which the keeper pivots. Upon pivotal movement of the keeper to the release position, the orientation of the retainer surface changes to an orientation in which an open end portion of a recess formed by the retainer surface faces toward the door. This results in the striker being movable away from the retainer surface to enable the door to move relative to the housing.

BRIEF DESCRIPTION OF THE DRAWINGS

The foregoing and other features of the present invention will become more apparent upon a consideration of the following description taken in connection with accompanying drawings wherein.

DESCRIPTION OF PREFERRED EMBODIMENT OF THE INVENTION

General Description

Figure 1:
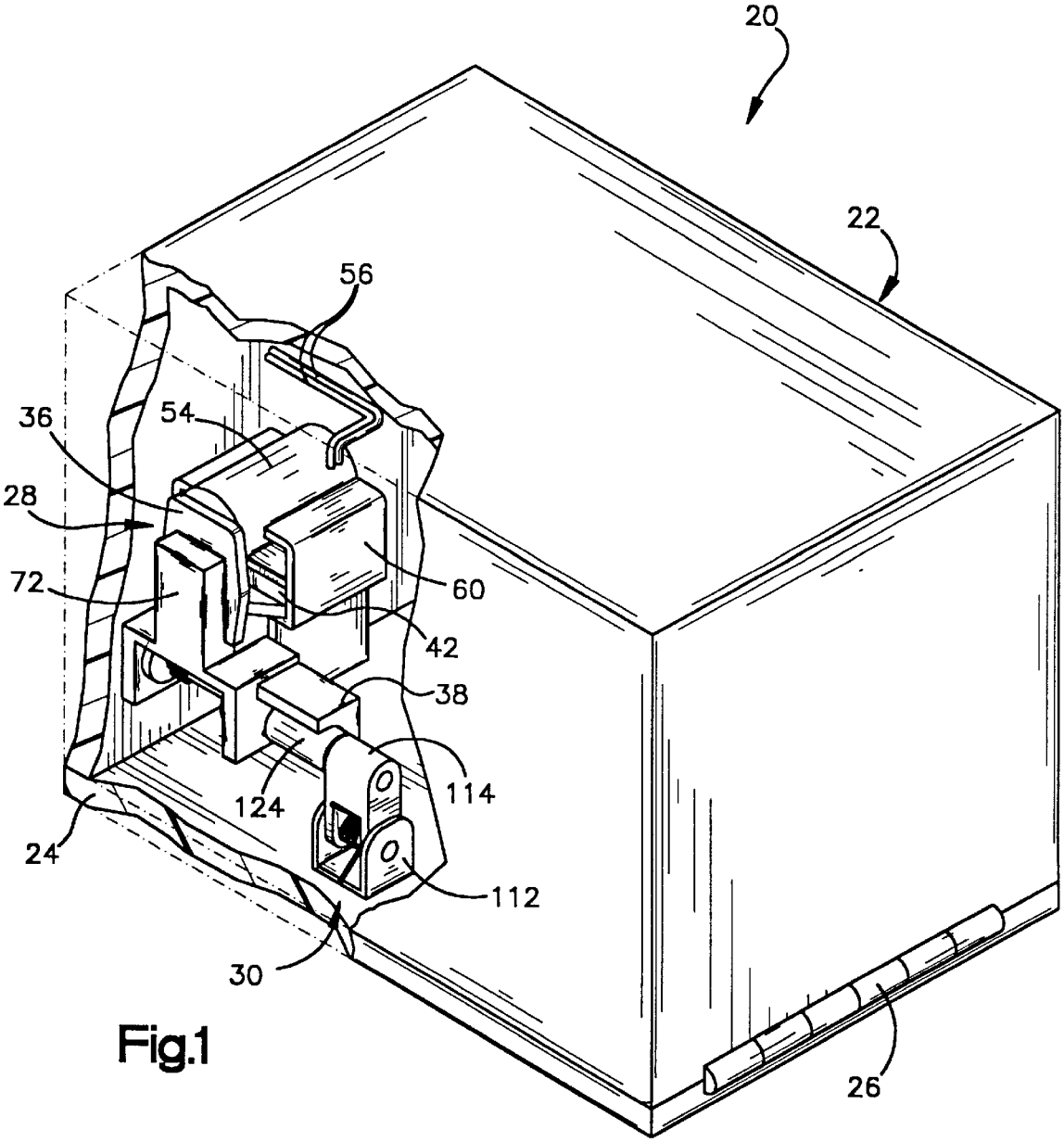
FIG. 1 is a partially broken away and schematized pictorial illustration of a latch assembly and striker assembly constructed in accordance with the present invention in association with a container.

A container 20 for holding one or more oxygen masks for one or more passengers of an aircraft is illustrated schematically in FIG. 1. It is contemplated that the container 20 will probably be mounted above a passenger seat. It is also contemplated that the container 20 may be constructed as a portion of the lower side of an overhead luggage compartment.

The container 20 includes a rectangular housing 22 and a door 24 which is connected with the housing by a hinge 26. A latch assembly 28 and a striker assembly 30, which are constructed in accordance with the present invention, cooperate to retain the door 24 in the closed condition until an oxygen mask or masks within the container 22 are to be deployed for passengers or the aircraft.

Figure 2:
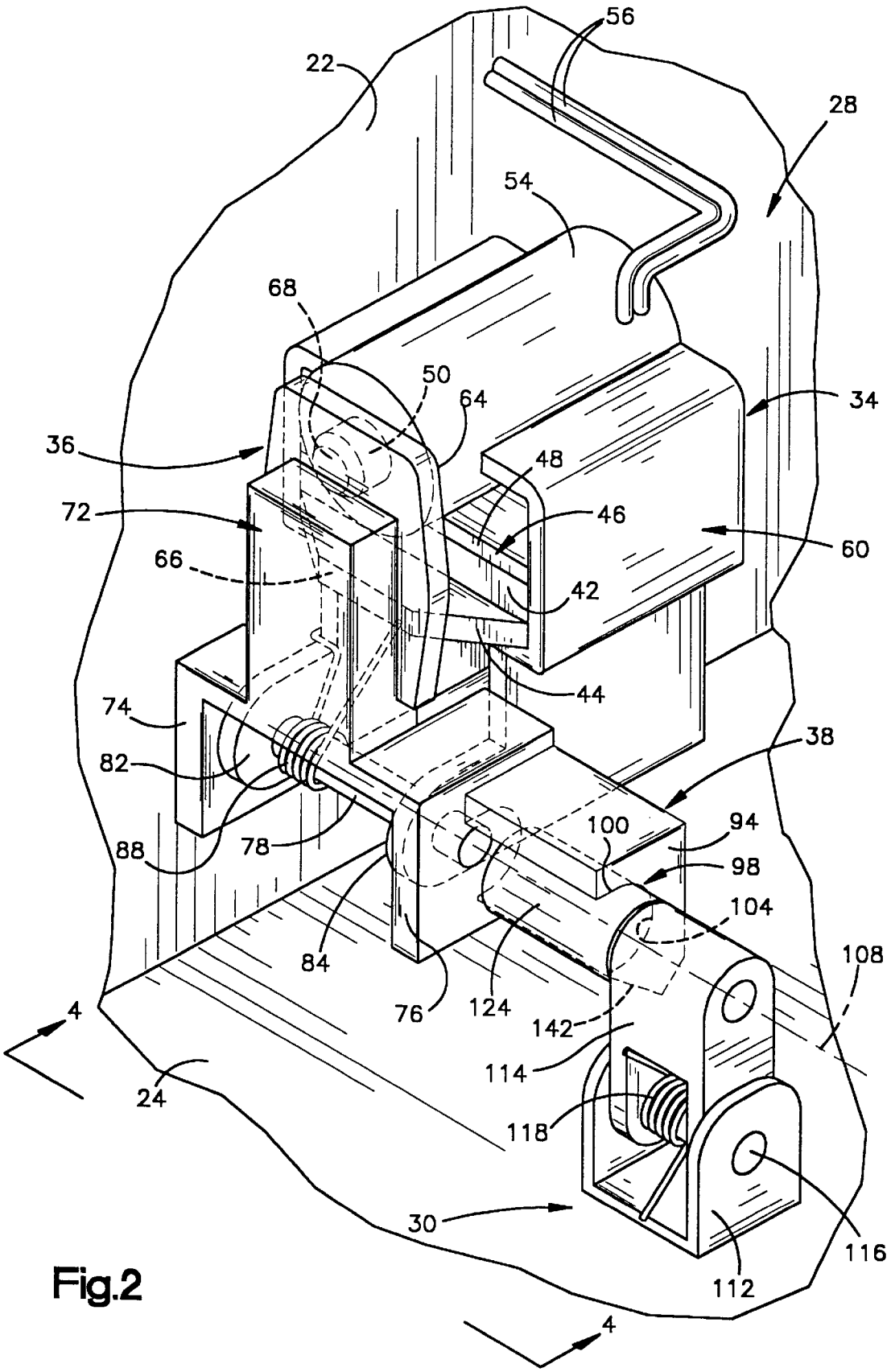
FIG. 2 is an enlarged pictorial illustration depicting the latch assembly of FIG. 1 in an engaged condition retaining the ,striker assembly and a door of the container against movement.
Figure 3:
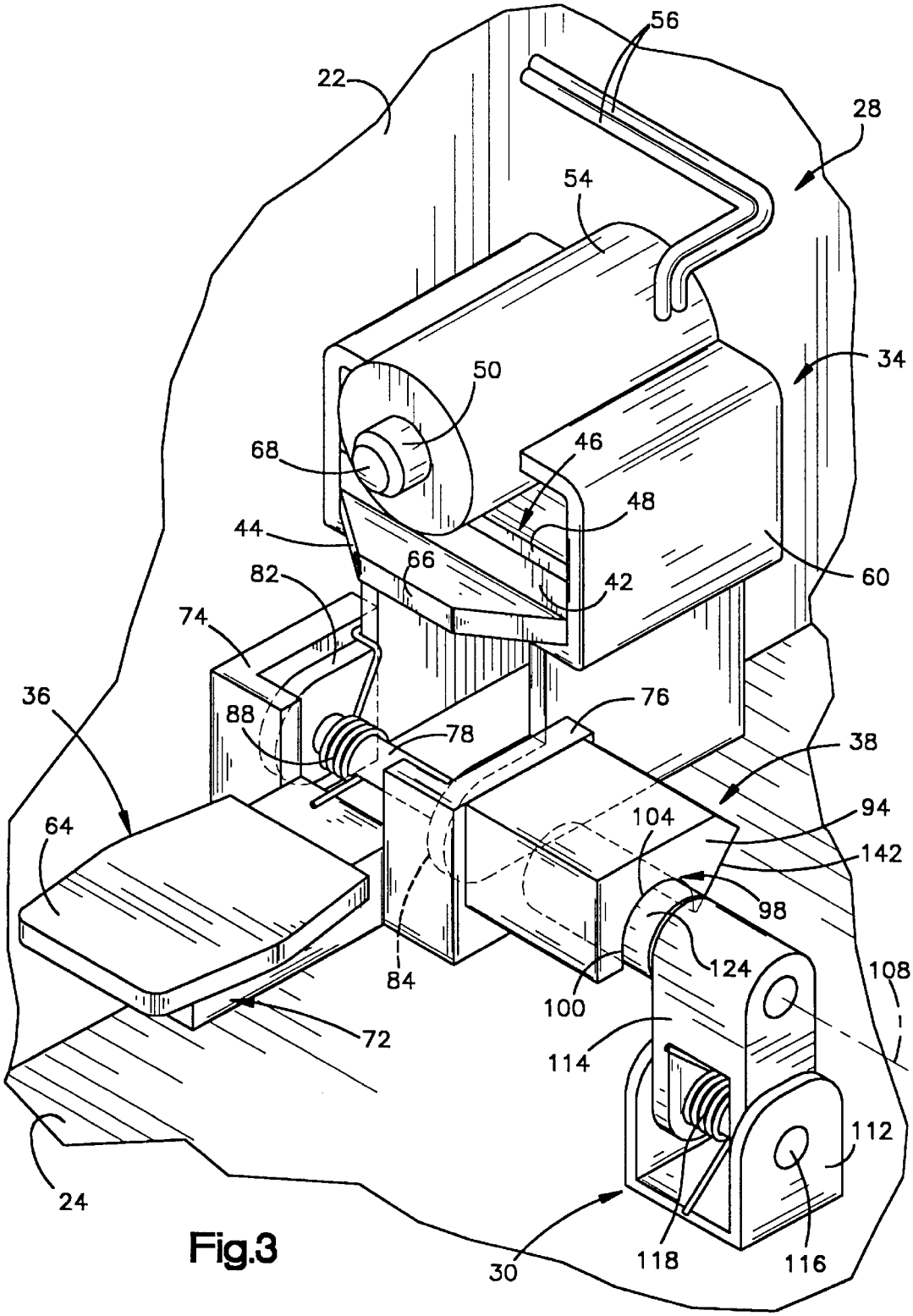
FIG. 3 is a pictorial illustration, generally similar to FIG. 2, illustrating the latch assembly in a disengaged condition in which the door and striker assembly are released for movement.
Figure 4:
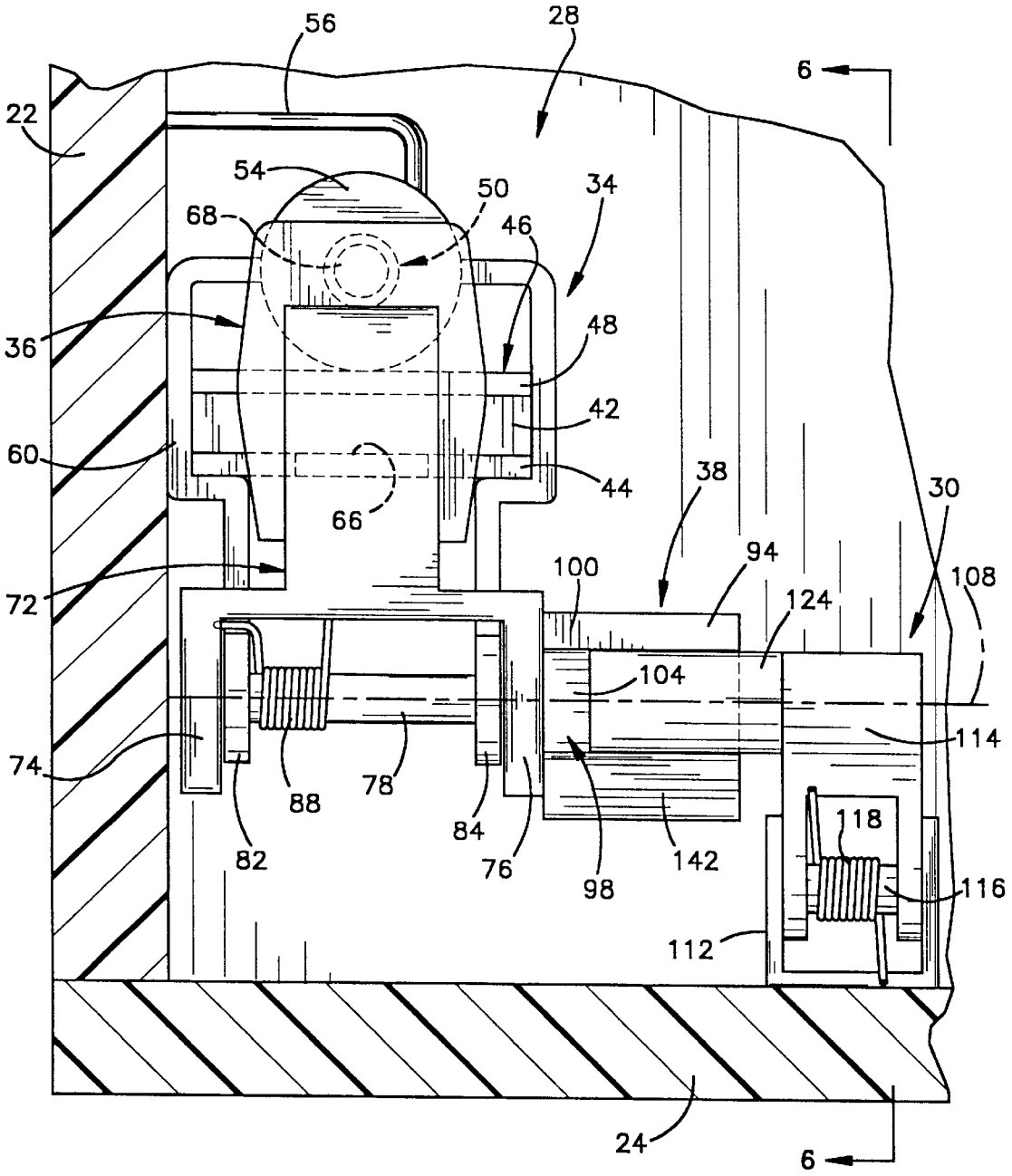
FIG. 4 is an elevational view, taken generally along the line 4—4 of FIG. 2, further illustrating the relationship between the latch assembly and striker assembly when the latch assembly is in the engaged condition.

When oxygen masks are to be deployed, the latch assembly 28 is operated from the engaged condition of FIGS. 1, 2 and 4 to the disengaged condition of FIG. 3. When the latch assembly 28 is in the engaged condition, the latch assembly securely holds the striker assembly 30 and door 24 against movement relative to the housing 22. When the latch assembly 28 is operated to the disengaged condition, the striker assembly 30 and door 24 are released to enable the door to pivot downwardly about the binge 26. This enables one or more oxygen masks within the housing 22 to drop downwardly for use by one or more passengers in the aircraft.

In accordance with one of the features of the present invention, the latch assembly 28 and striker assembly 30 are relatively light in weight. Thus, a known latch and striker assembly having a construction generally similar to that disclosed in U.S. Pat. No. 3,764,172 has a weight of approximately 2.5 ounces. One specific embodiment of the latch assembly 28 and striker assembly 30 of FIG. 1 had a weight of approximately 1.5 ounces. Thus, this specific latch assembly 28 and striker assembly 30 weighed 40% less than the prior art latch assembly and striker assembly. When this weight saving is multiplied by the number of latch assemblies and striker assemblies required in a large passenger aircraft, the weight saving becomes significant.

In addition to being relatively light in weight, it is important that the latch assembly 28 and striker assembly 30 remain in the engaged condition shown in FIG. 1 when the aircraft is subjected to relatively large operating forces. Thus, if the oxygen mask or masks within the container 20 are deployed during operating conditions in which they are not required, the deployment of the oxygen masks would unnecessarily alarm passengers of the aircraft. However, if and when the aircraft encounters operating conditions which make the deployment of the oxygen mask or masks advisable, the latch assembly 28 is quickly and reliably operable from the engaged condition to the disengaged condition to effect deployment of the oxygen mask or masks.

Although it is believed that the latch assembly 28 and the striker assembly 30 will be particularly advantageous when used in association with a container for holding one or more passenger oxygen masks on an aircraft, it is contemplated that the latch assembly and striker assembly may be used in a different environment. Thus, the latch assembly 28 and striker assembly 30 could be utilized in conjunction with many different types of housings to hold many different types of movable members or doors in a desired position when the latch assembly is in an engaged condition.

Latch Assembly

The latch assembly 28 includes a magnet assembly 34 (FIG. 2), a pivotally mounted keeper 36, and a retainer 38. The magnet assembly 34 attracts the keeper 36 to maintain the retainer 38 in the engaged position illustrated in FIG. 2. When the retainer 38 is in the engaged position illustrated in FIG. 2, the retainer holds the striker assembly 30 and door 24 against movement relative to the housing 22. The magnet assembly 34 is operable to release the keeper 36 for pivotal movement from the initial position of FIG. 2 to the release position of FIG. 3. Upon movement of the keeper 36 to the release position of FIG. 3, the retainer 38 is moved to its disengaged position in which the striker assembly 30 and door 24 are released for movement relative to the housing 22.

The magnet assembly 34 includes a thin flat rectangular permanent magnet 42. A lower pole piece 44 is disposed in abutting engagement with a flat rectangular lower side surface of the permanent magnet 42. An upper pole piece 46 is disposed in abutting engagement with a flat upper side surface of the permanent magnet 42. The upper and lower pole pieces 44 and 46 are formed of soft magnetizable iron and conduct magnetic flux provided by the permanent magnet 42.

The lower pole piece 44 is formed by a single flat piece of metal. The upper pole piece 46 has a flat base 48 which is disposed in abutting engagement with an upper side of the permanent magnet 44. A cylindrical arm 50 (FIG. 5) extends generally parallel to the base 48 and is connected with the base by an upstanding section 52.

One of the poles of the permanent magnet 42 is disposed adjacent to the lower pole piece 44. The opposite pole of the permanent magnet is disposed adjacent to the base 48 of the pole piece 46. A coil 54 extends around the arm 50 and is connected with suitable control circuitry by electrical conductors or wires 56 (FIG. 2).

A relatively light weight thermoplastic or composite material frame 60 (FIGS. 2–4) encloses the magnet assembly 34 and coil 54. The frame 60 is fixedly connected to the housing 22. The frame 60 retains the magnet assembly 34 against movement relative to the housing 22.

When the latch assembly 28 is in the engaged condition shown in FIGS. 2 and 4, the keeper 36 engages the lower pole piece 44 and the arm 50 of the upper pole piece 46. Thus, the keeper 36 has a flat major side surface 64 (FIG. 3) which abuttingly engages a flat rectangular pole face 66 on the lower pole piece 44. The major side surface 64 of the keeper 36 also engages a flat circular pole face 68 on the arm 50 of the upper pole piece 46 when the latch assembly 28 is in the engaged condition. The keeper 36 is formed of a soft magnetizable iron.

When the latch assembly 28 is in the engaged condition of FIGS. 2 and 4, the keeper 36 cooperates with the lower pole piece 44 and upper pole piece 46 to form a path along which magnetic flux from the permanent magnet 42 is conducted between opposite poles of the permanent magnet. When the latch assembly 28 is in the disengaged condition (FIG. 3), the keeper 36 is spaced from the upper and lower pole pieces 44 and 46. This results in an interruption of the path along which flux is conducted between the upper and lower pole pieces 44 and 46.

The keeper 36 is fixedly secured to the upper end portion of a light weight thermoplastic or composite material mounting arm 72. The mounting arm 72 has opposite end portions 74 and 76 (FIG. 2) which are fixedly secured to opposite end portions of a support shaft 78. The shaft 78 is rotatably supported on outwardly projecting sections 82 and 84 of the frame 60 (FIGS. 2–4). Thus, upon movement of the keeper 36 between the initial position of FIGS. 2 and 4 and the release position of FIG. 3, the mounting arm 72 and shaft 78 pivot relative to the frame 60. A coil spring 88 continuously biases the keeper 36 and mounting arm 72 toward the release position of FIG. 3.

The retainer 38 retains the striker assembly 30 and door 24 against movement relative to the latch assembly 28 and housing 22 when the latch assembly is in the engaged condition of FIGS. 2 and 4. When the latch assembly 28 is in the disengaged condition of FIG. 3, the retainer 38 releases the striker assembly 30 to enable the striker assembly and door 24 to move downwardly (as viewed in FIG. 3). It is contemplated that the door 24 will swing downwardly about the hinge 26 (FIG. 1) under the influence of gravity and/or under the influence of a biasing spring associated with the hinge.

The retainer 38 includes a light weight thermoplastic or composite material body section 94 which is fixedly connected to the end portion 76 of the keeper mounting arm 72. Upon pivotal movement of the keeper mounting arm 72 from the initial position of FIG. 2 to the release position of FIG. 3, the body section 94 of the retainer 38 pivots with the keeper 36. The retainer body section 94 and keeper 36 pivot through an arcuate distance of approximately 90° in a counterclockwise direction (as viewed in FIGS. 2 and 3) from the initial position to the release position.

The body section 94 of the retainer 38 has a generally U-shaped recess 98 having an open end portion. When the keeper 36 is in the initial position of FIG. 2, the open end portion 100 of the U-shaped recess 98 faces toward the left (as viewed in FIG. 2). At this time, the open end portion 100 of the recess 98 faces in a direction which is skewed slightly upwardly away from an upper side surface of the door 24.

When the keeper 36 is in the initial position of FIG. 2, a lower side portion of a generally U-shaped surface of the recess 98 engages the striker assembly 30 to block downward movement of the striker assembly and door 24. At this time, the lower side portion of the generally U-shaped surface of the recess 98 applies on upwardly directed force against the striker assembly 30 to hold the door 24 in its closed position.

Upon pivotal movement of the keeper mounting arm 72 and keeper 36 from the initial position of FIG. 2 to the release position of FIG. 3, the retainer body 94 pivots with the keeper mounting arm. The open end portion 100 of the recess 98 pivots to a position in which it faces straight downwardly (as viewed in FIG. 3) toward the door 24. This enables the striker assembly 30 and door 24 to move downwardly away from the retainer 38.

The generally U-shaped recess 98 has an arcuate surface 104 which forms a closed end portion of the recess. The arcuate surface 104 has a semicircular in cross sectional configuration and forms half of a cylinder. The arcuate surface 104 has a center of curvature which is disposed on an axis 108 about which the keeper mounting arm 72 pivots. Thus, the center of curvature of the arcuate surface 104 of the generally U-shaped recess 98 is disposed on the central axis 108 of the shaft 78 to which the mounting arm 72 is fixedly connected for pivotal movement between the initial position of FIG. 2 and the release position of FIG. 3.

Since the center of curvature of the arcuate surface 104 of the recess 98 is disposed on the axis 108, force transmitted between the striker assembly 30 and the retainer body 94 is transmitted through the axis 108. Thus, downward force is transmitted from the striker assembly 30 to the retainer 38 when the latch assembly is in the engaged condition. This downward force is transmitted along a vertical path which extends through and perpendicular to the axis 108. Similarly, sideward force transmitted between the striker assembly 30 and retainer 38 also extends through the axis 108 in a direction perpendicular to the axis.

Since force transmitted between the striker assembly 30 and retainer 38 is transmitted through the axis 108, the force is ineffective to apply torque which urges the keeper mounting arm 72 to rotate in a counterclockwise direction (as viewed in FIG. 2) about the axis 108. Therefore, even if an aircraft in which the latch assembly 28 and striker assembly 30 are located is subjected to operating forces which are several times the force of gravity, these operating forces do not result in striker assembly 30 applying force to the retainer 38 which tends to rotate the keeper mounting arm 72 away from the permanent magnet 42. This enables the strength of the permanent magnet 42 and spring 88 to be selected in such a manner as to enable the permanent magnet to maintain the keeper 36 in engagement with lower and upper pole pieces 44 and 46 when exposed to relatively large operating forces.

In order to minimize the weight of the latch assembly 28, as many components of the latch assembly as is reasonably possible are formed of relatively light weight aluminum. Thus, the frame 60, keeper mounting arm 72, shaft 78 and retainer body 94 are all formed of relatively light weight aluminum. Of course, the permanent magnet 42, lower pole piece 44, upper pole piece 46, and keeper 36 are formed of magnetizable material, such as iron.

Strike Assembly

Figure 7:
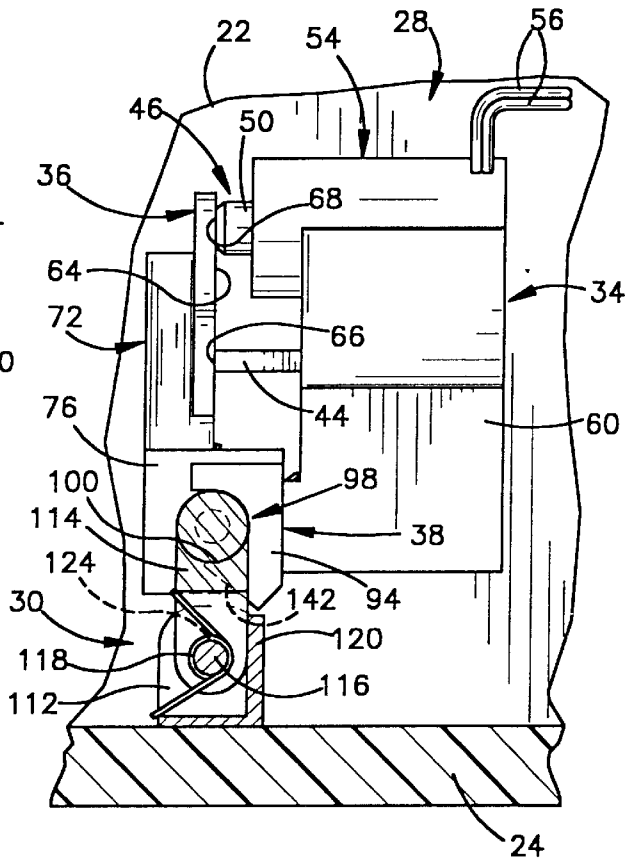
FIG. 7 is a side elevational view, generally similar to FIG. 6, illustrating the relationship between the striker assembly and latch assembly when the door is in the closed condition.
Figure 6:
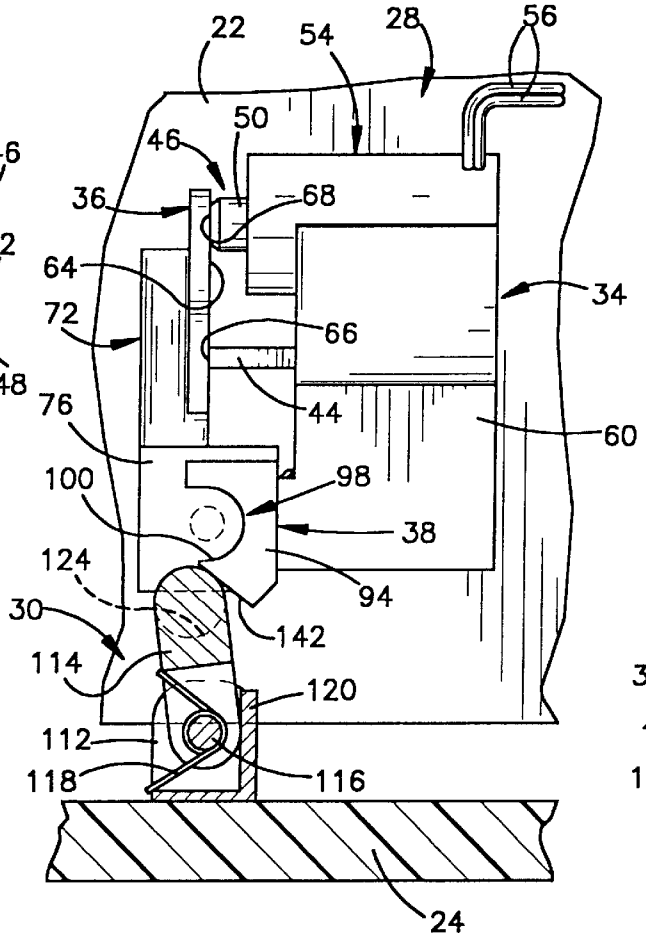
FIG. 6 is a side elevational view, taken generally along the lines 6—6 of FIG. 4, illustrating the relationship between the striker assembly and the latch assembly as the door is moved from an open condition toward a closed condition.

The striker assembly 30 includes a base 112 which is fixedly secured to the door 24. A striker arm 114 is rotatably mounted on a cylindrical shaft 116 connected with the base 112. A biasing spring 118 urges the arm 114 in a clockwise direction (as viewed in FIGS. 6 and 7) toward a stop member or plate 120 (FIGS. 6 and 7). A cylindrical roller 124 is rotatably mounted on an upper (as viewed in FIGS. 2, 4, 6 and 7) end of the arm 114.

When the latch assembly 28 is in the engaged position of FIG. 2, the spring 118 biases the striker arm 114 in a clockwise direction to press the roller 24 against the arcuate surface 104 of the generally U-shaped recess 98. The radius of the cylindrical roller 124 is only very slightly smaller than the radius of curvature of the arcuate surface 104 of the recess 98. This enables the retainer body 94 to hold the striker assembly 30 and door 24 against vertical movement.

When the latch assembly 28 is in the engaged condition, the central axis of the roller 124 is coincident with the axis 108 about which the keeper mounting arm 72 rotates. Therefore, the cylindrical roller 124 is ineffective to apply torsional forces to the retainer 38 and keeper mounting arm 72 about the axis 108. Any tendency for the roller 124 to apply torque to the retainer body 94 will merely result in the roller 124 rotating relative to the striker arm 114 about the axis 108.

Like the latch assembly 28, the striker assembly 30 is as light as possible. Thus, many of the components of the striker assembly 30 are formed of light weight aluminum. The base 112, striker arm 114, shaft 116, and roller 124 are all formed of light weight aluminum.

Operation

Figure 5:
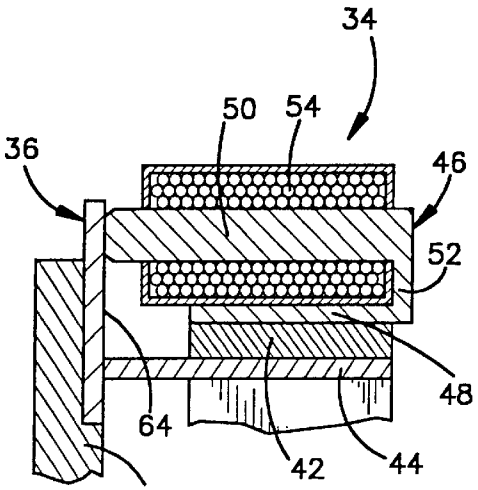
FIG. 5 is a schematized illustration depicting the relationship between a keeper and pole pieces of a permanent magnet when the latch assembly is in the engaged condition of FIGS. 2 and 4.
Figure 9:
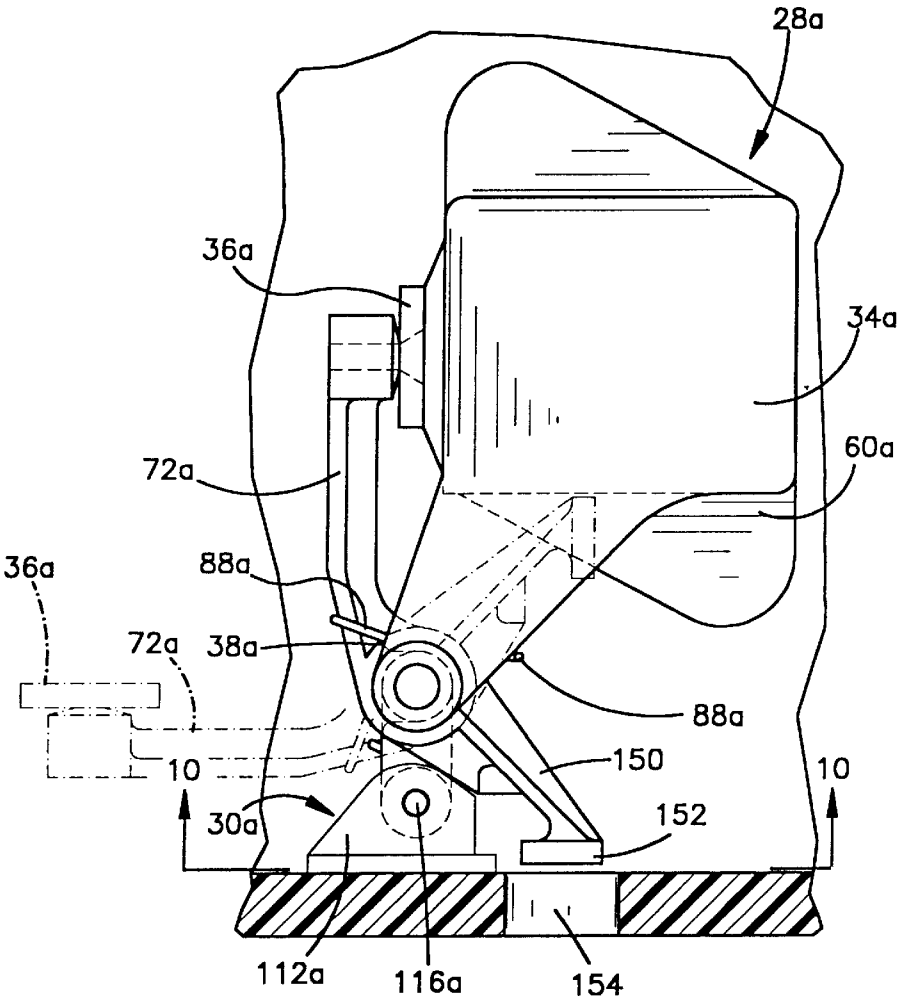
FIG. 9 is a side elevational view, taken generally along the line 9—9 of FIG. 8, further illustrating the relationship between the striker assembly and latch assembly.

When the keeper 36 is in the initial position of FIG. 2, the keeper engages the pole face 66 of the lower pole piece 44 and the pole face 68 of the upper pole piece 46. The north pole of the permanent magnet 42 is disposed adjacent to the lower pole piece 44. Therefore, magnetic flux is conducted from the north pole at the lower side of the magnet 42 through the lower pole piece 44 to the keeper 36 (FIG. 5). Magnetic flux is conducted from the keeper 36 into the cylindrical arm 50 of the upper pole piece 46. The flux then flows from the arm 50 through the connector section 52 to the lower section 48 of the upper pole piece 46. The lower section 48 of the upper pole piece 46 is disposed adjacent to the south pole at the upper side of the permanent magnet 42.

The magnetic flux which is conducted through the keeper 36 maintains the keeper in abutting engagement with the lower and upper pole pieces 44 and 46 against the influence of the biasing spring 88 (FIGS. 2 and 4). The strength of the permanent magnet 42 is sufficient to maintain the keeper 36 engagement with the lower and upper pole pieces 44 and 46 against the influence of forces which are several times greater than any operating forces which may be encountered by a passenger aircraft during normal operating conditions.

Operating forces which tend to cause the door 24 to pivot downwardly (as viewed in FIG. 2) relative to the housing 22 are transmitted to the latch assembly 28 by the striker assembly 30. These forces are transmitted by the striker roller 124 to the retainer body 94. The line of action of these forces extends perpendicular to and through the axis 108. Therefore, any operating force tending to cause the door 24 to open is ineffective to apply torque to rotate the pole piece mounting arm 72 about the axis 108. If the aircraft encounters relatively large operating forces which may be several times the magnitude of the force of gravity, the operating forces do not exert a force on the keeper mounting arm 72 which tends to pivot the keeper mounting ar about the axis 108.

When the latch assembly 28 is to be operated from the engaged condition of FIG. 2 to the release condition of FIG. 3 to release the striker assembly 30 and door 24 for downward movement (as viewed in FIGS. 2 and 3), the coil 54 is energized. It is presently preferred to energize the coil 54 by conducting rectified 115 volt 400 cycle AC current to the coil through the leads 56. Energization of the coil 54 results in the coil establishing a magnetic field in a well known manner.

The magnetic field of the coil 54 opposes the magnetic field of the permanent magnet 42. Thus, the north pole of the magnetic field established by energization or the coil 54 is disposed adjacent to pole face 68 and keeper 36. This results in the magnetic flux from the coil 54 opposing the magnetic flux from the permanent magnet 42. When this occurs, the force maintaining the keeper 36 in engagement with the lower and upper pole pieces 44 and 46 is substantially reduced. The biasing spring 88 then pivots the keeper mounting arm 72 in a counterclockwise direction (as viewed in FIG. 2) from the initial position of FIG. 2 to the release position of FIG. 3.

As the keeper mounting arm 72 and keeper 36 pivot from the initial position of FIG. 2 to the release position of FIG. 3, the retainer body 94 is rotated about the axis 108. As the retainer body 94 is rotated about the axis 108, the open end portion of the retainer body moves from a position in which it faces leftwardly and slightly upwardly (as viewed in FIG. 2) to a position in which it faces straight downwardly (FIG. 3) toward the door 24. This releases the striker assembly 30 and door 24 for downward movement under the influence of gravity or the combined influence of gravity and a biasing spring associated with the hinge 26. As the door 24 pivots downwardly about the hinge 26, an oxygen mask is deployed from the container 20.

After an oxygen mask has been deployed from the container 20, it is contemplated that it will be desired to again store the oxygen mask in the container 20 with the door 24 held closed by engagement of the latch assembly 28 with the striker assembly 30. To accomplish this, the current conducted to the coil 54 is interrupted. The keeper mounting arm 72 is then manually pivoted in a clockwise direction from the release position of FIG. 3 back to the initial position of FIGS. 2 and 4. When the keeper mounting arm 72 is manually pivoted back to the initial position of FIGS. 2 and 4, the door 24 is hanging downwardly in an open position so that the striker assembly 30 is spaced from the latch assembly 28.

The door 24 is then pivoted to a partially closed position and the oxygen mask positioned on a upper side surface of the door with the mask partially in the container 20. The upward pivotal movement of the door 24 is then continued to move the striker assembly 30 upwardly. As the striker assembly 30 moves upwardly, the striker roller 124 moves into engagement with the latch assembly 28. Thus, a cam surface 142 on the lower side of the retainer body 94 is engaged by the striker roller 124 (FIG. 6).

Continued upward movement of the door 24 results in the retainer body cam surface 142 applying a force against the striker roller 124. This force causes the striker arm 114 to pivot in a counterclockwise direction (as viewed in FIG. 6) against the influence of the biasing spring 118. As the door 24 continues to be closed, the roller 124 rolls upwardly into the open end portion 100 of the generally Ushaped recess 98. The roller 124 then snaps into the recess 98 (FIG. 7) and pulls the door 24 upwardly to a fully closed position. This results in the latch assembly 28 again engaging the striker assembly 30 as shown in FIGS. 2 and 4.

Second Embodiment

In the embodiment of the invention illustrated in FIGS. 1–17, the retainer 38 and striker assembly 30 are offset to one side (the right as viewed in FIG. 2) of the keeper mounting arm 72. In the embodiment of the invention illustrated in FIGS. 8–11, the retainer and striker assembly are aligned with an upright central axis of the keeper mounting arm. Since the embodiment of the invention illustrated in FIGS. 8–11 is generally similar to the embodiment of the invention illustrated in FIGS. 1–7, similar numerals will be utilized to designate similar components, the suffix letter "a" being associated with the numerals of FIGS. 8–11 to avoid confusion.

A latch assembly 28a (FIGS. 8 and 9) includes a magnet assembly 34a (FIG. 8), a pivotally mounted keeper 36a and a retainer 38a (FIGS. 8 and 11) which engages a striker assembly 30a. The magnet assembly 34a is offset 90° from the orientation of the magnet assembly 34 of FIGS. 1–7. The magnet assembly 34a includes a permanent magnet 42a which abuts a lower or right pole piece 44a and an upper or left pole piece 46a. The left pole piece 46a includes a cylindrical arm (not shown) around which a coil 54a is disposed. A frame 60a is connected to a housing 22a and to the magnet assembly 34a.

A keeper mounting arm 72a is pivotally mounted on a pair of separate shaft sections 78a mounted on projections 82a and 84a of the frame 60a. A spring 88a biases the keeper mounting arm 72a away from the magnet assembly 34a. Thus, the biasing spring 88a urges the keeper mounting arm 72a to pivot in a counterclockwise direction from the initial position shown in solid lines in FIG. 9 to the release position shown in dashed lines in FIG. 9.

The retainer 38a (FIG. 11) includes a body 94a in which a generally U-shaped recess 98a is formed. The recess 98a has an open end portion 100a and an arcuate surface 104a. The center of curvature of the arcuate surface 104a of the recess 98a is coincident with an axis 108a (FIG. 8) about which the keeper mounting arm 72a pivots. In accordance with a feature of this embodiment of the invention, the recess 98a is disposed along a vertical (as viewed in FIG. 8) center line of the keeper mounting arm 72a between the shaft sections 78a upon which the keeper mounting arm 72a is pivotally mounted.

Figure 8:
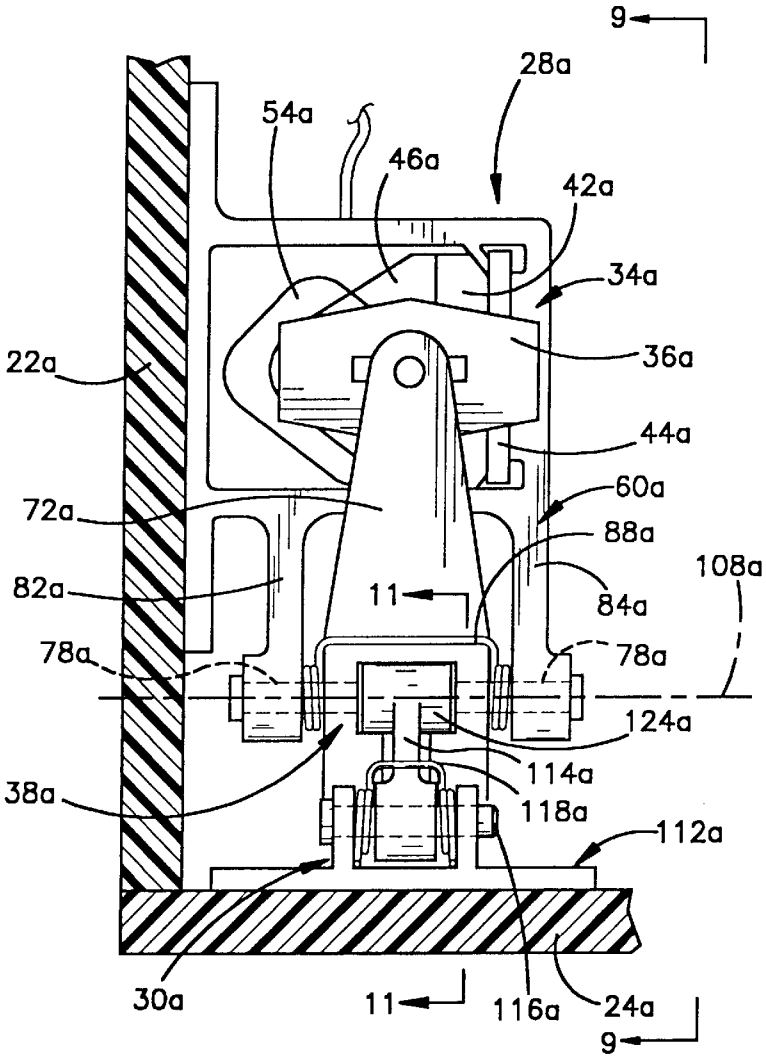
FIG. 8 is a front elevational view of a striker assembly and latch assembly forming a second embodiment of the invention.
Figure 11:
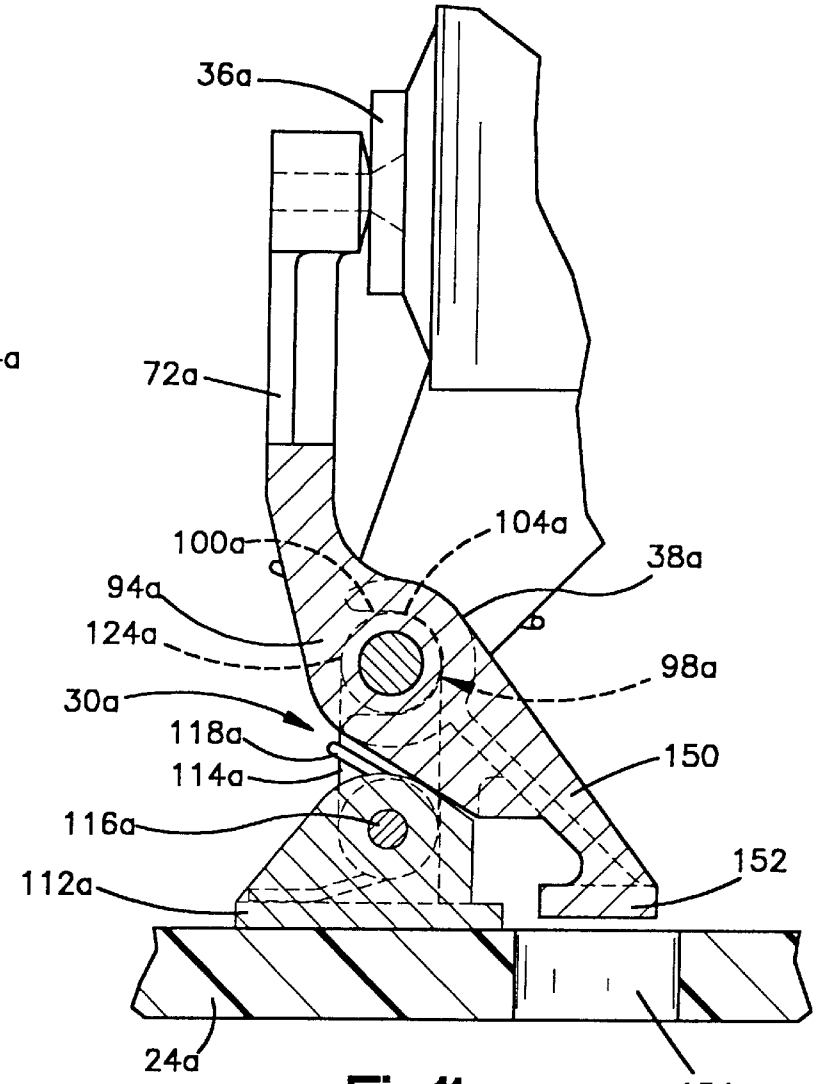
FIG. 11 is a fragmentary sectional view, taken generally along the line 11—11 of FIG. 8, further illustrating the relationship between the striker assembly and latch assembly.
Figure 10:
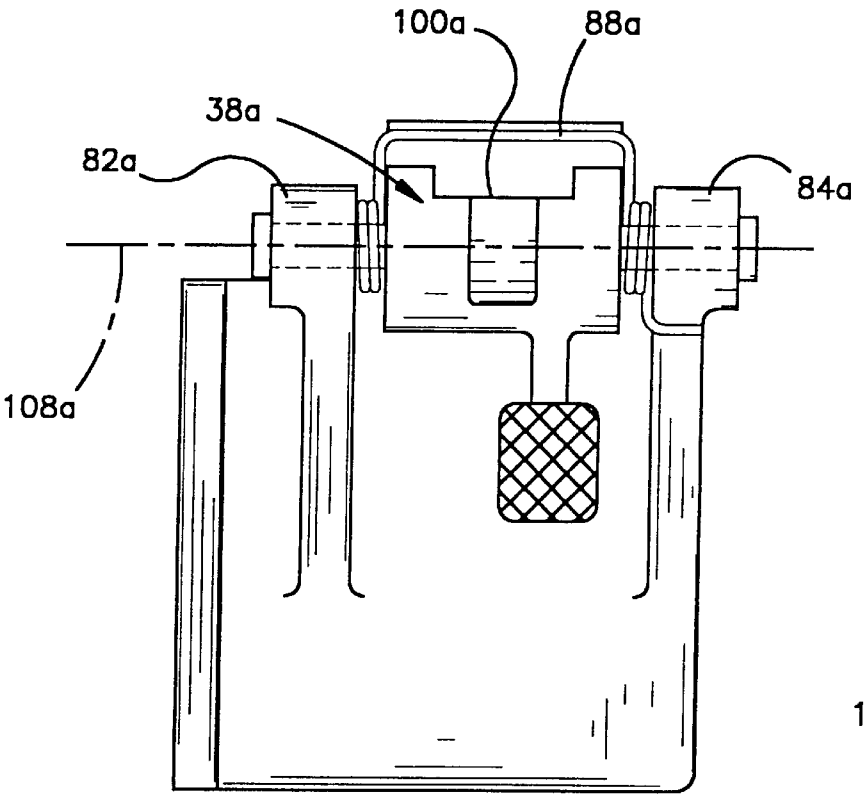
FIG. 10 is a bottom plan view, taken generally along the line 10—10 of FIG. 9 and further illustrating that the construction of the latch assembly with the striker assembly disengaged from the latch assembly.

The striker assembly 30a includes a base 12a which is secured to the door 24a (FIGS. 8 and 11). The striker assembly 30a includes a striker arm 114a having a cylindrical upper end portion 124a. The striker arm 114a is fixedly connected to a shaft 116a which is pivotally mounted on the base 112a. A biasing spring 118a urges the striker arm in a counterclockwise direction as viewed in FIG. 11.

A release lever 150 is connected with the keeper mounting arm 72a. The release lever 150 has an end portion 152 which is engagable through an opening 154 formed in the door 24a. A suitable tool can be inserted through the opening 154 in the door 24a and pressed against the end portion 152 of the release lever 150 to pivot the keeper 36a from the initial position to the release position.

Conclusion

In view of the foregoing description, it is apparent that the present invention provides a new and improved assembly which retains a door 24 against movement relative to a housing 22. The assembly includes a striker assembly 30 which is connected with the door 24 for movement therewith relative to the housing 22. A latch assembly 28 is connected with the housing 22 to hold the striker assembly 30 and door 24 against movement relative to the housing (FIG. 2) and to release the striker assembly and door from movement relative to the housing (FIG. 3).

The latch assembly 28 includes a permanent magnet 42 which is fixedly connected with the housing 22. A coil 54 extends around a pole piece 46 connected with the permanent magnet 42. A keeper 36 is mounted for pivotal movement between an initial position (FIG. 2) in which it engages the pole piece 46 and a release position (FIG. 3) in which the keeper 36 is spaced from the pole piece.

A retainer surface 104 is connected with the keeper 36 to retain the striker assembly 30 when the keeper 36 is in the initial position (FIG. 2). The retainer surface 104 is preferably pivotal with the keeper 36. Thus, the retainer surface 104 is pivotal between a retaining position (FIG. 2) in which it retains the striker assembly 30 and door 24 against movement relative to the housing 22 and a release position (FIG. 3) in which the retainer surface is ineffective to retain the striker assembly 30 against movement to thereby release the door.

The striker assembly 30 includes a surface 124 which cooperates with the retainer surface 104 to transmit force between the striker assembly 30 and latch assembly 28 when the keeper 36 is in the initial position. The force transmitted between the striker surface 124 and the retainer surface 104 is advantageously along a path which extends through an axis 108 about which the keeper 36 pivots. This minimizes any tendency for the force transmitted between the striker assembly 30 and the latch assembly 28 to pivot the keeper 36 from the initial position to the release position.

Although the retainer surface 104 may have many different configurations, in one specific embodiment of the invention, the retainer surface 104 had an arcuate configuration with a center of curvature disposed on the axis 108 about which the keeper pivots. Upon pivotal movement of the keeper 36 to the release position, the orientation of the retainer surface 104 changes to an orientation in which an open end portion 100 of a recess 98 formed by the retainer surface 104 faces toward the door 24. This results in the striker assembly 28 being movable away from the retainer surface 104 to enable the door 24 to move relative to the housing 22.

Having described the invention, the following is claimed:

1. An assembly for retaining a door against movement relative to a housing, said assembly comprising a striker connected with the door for movement there with relative to the housing, and a latch assembly connected with the housing for holding the striker and door against movement relative to the housing and for releasing the striker and door for movement relative to the housing, said latch assembly including a permanent magnet fixedly connected with the housing, a pole piece fixedly connected with said permanent magnet to provide a flow path for magnetic flux, *a* coil [means] extending around at least a portion of said pole piece, a keeper, mounting means for mounting said keeper for pivotal movement relative to sad permanent magnet and pole piece between a first position in which said keeper engages said pole piece and a second position in which said keeper is spaced from said pole piece, said permanent magnet being effective to retain said keeper in the first position, said coil being energizable to oppose said permanent magnet and release said keeper for pivotal movement from the first position to the second position, and a retainer surface connected with said keeper for pivotal movement therewith relative to said permanent magnet and pole piece, sad retainer surface being pivotal with said keeper between a retaining position in which said retainer surface retains said striker against movement relative to the housing to thereby retain the door against movement relative to the housing and a release position in which said retainer surface is ineffective to retain said striker against movement relative to the housing to thereby release the door for movement relative to the housing, said retainer surface being disposed in the retaining position when said keeper is in the first position and being disposed in the release position when said keeper is in the second position *said retainer surface includes an arcuate surface which is engaged by said striker when said keeper is in the first position, said arcuate surface having a center of curvature which is disposed on the axis about which said keeper pivots*.

2. An assembly as set forth in claim 1 wherein said retainer surface at least partially defines a recess having an open end portion, said open end portion of said recess facing in a first direction when said keeper is in the first position, said open end portion of the recess facing toward the door in a second direction which is offset from the first direction when said keeper is in the second position, said striker being engaged by the recess when said keeper is in the first position and said open end portion or the recess faces in the first direction to retain the door in a predetermined position relative to the housing, said retainer surface being ineffective to retain said striker in the recess when said open end portion of the recess faces in the second direction.

3. An assembly as set forth in claim 2 wherein the recess has a generally U-shaped configuration.

[4. An assembly as set forth in claim 2 wherein said mounting means mounts said keeper and said retainer surface for pivotal movement about an axis which extends through the recess.]

[5. An assembly as set forth in claim 2 wherein said retainer surface is offset to one side of a plane which contains a central axis of said coil means and extends perpendicular to an axis about which said keeper is pivotal relative to said permanent magnet.]

6. An assembly as set forth in claim 2 wherein said mounting means includes an arm connected with said keeper and first and second support means disposed adjacent to said arm for supporting said arm for pivotal movement, said retainer surface being connected with said arm and disposed between said first and second support means.

7. An assembly as set forth in claim 1 wherein said retainer surface applies force against said striker urging said striker toward said latch assembly when said keeper is in the first position to thereby urge the door toward a predetermined position relative to the housing.

8. An assembly as set forth in claim 1 wherein said retainer surface at least partially defines a recess, said striker including a striker member pivotally connected with the door and spring means for pivoting said striker member into the recess when said keeper is in the first position.

9. An assembly as set forth in claim [8] *1* wherein said retainer surface at least partially defines a recess having a generally U-shaped configuration, *said striker including a striker member,* at least a portion of said striker member being disposed in said recess when said [pole piece] *keeper* is in the first position.

[10. An assembly as set forth in claim 1 wherein said retainer surface means includes an arcuate surface which is engaged by said striker when said keeper is in the first position, said arcuate surface having a center of curvature which is disposed on the axis about which said keeper pivots when said keeper is in the first position.]

11. An assembly as set forth in claim [10] *1* wherein said mounting means includes an arm having a first portion which is connected to said keeper and a second portion which is supported for pivotal movement, said arcuate surface being disposed on said second portion of said arm.

12. An assembly as set forth in claim [10] *11* wherein the center of curvature of said arcuate surface is disposed on the axis about which said keeper pivots when said keeper is in the second position.

[13. An assembly for retaining a door against movement relative to a housing, said assembly comprising a striker connected with the door for movement therewith relative to the housing, and a latch assembly connected with the housing for holding the striker and door against movement relative to the housing and for releasing the striker and door for movement relative to the housing said latch assembly including permanent magnet fixedly connected with the housing, a pole piece fixedly connected with said permanent magnet to provide a flow path for magnetic flux, coil means extending around at least a portion of said pole piece, a keeper, mounting means for mounting said keeper for pivotal movement relative to said permanent magnet and pole piece between a first position in which said keeper engages said pole piece and a second position in which said keeper is spaced from said pole piece, said permanent magnet being effective to retain said keeper in the first position, said coil being energizable to oppose said permanent magnet and release said keeper for pivotal movement from the first position to the second position, and retainer surface means connected with said keeper for retaining said striker when said keeper is in the first position, said striker including striker surface means for cooperating with said retainer surface means when said keeper is in the first position to transmit force between said striker and latch assembly along a path which extends through an axis about which said keeper pivots to thereby retain the door against movement relative to the housing while minimizing any tendency for the force transmitted between said striker and latch assembly to pivot said keeper from the first position to the second position.]

14. An assembly [as set forth in claim 13 wherein] *for retaining a door against movement relative to a housing, said assembly comprising a striker connected with the door for movement therewith relative to the housing, and a latch assembly connected with the housing for holding the striker and door against movement relative to the housing and for releasing the striker and door for movement relative to the housing, said latch assembly including a permanent magnet fixedly connected with the housing, a pole piece fixedly connected with said permanent magnet to provide a flow path for magnetic flux, a coil extending around at least a portion of said pole piece, a keeper, mounting means for mounting said keeper for pivotal movement relative to said permanent magnet and pole piece between a first position in which said keeper engages said pole piece and a second position in which said keeper is spaced from said pole piece, said permanent magnet being effective to retain said keeper in the first position, said coil being energizable to oppose said permanent magnet and release said keeper for pivotal movement from the first position to the second position, and retainer surface means connected with said keeper for retaining said striker when said keeper is in the first position, said striker including striker surface means for cooperating with said retainer surface means when said keeper is in the first position to transmit force between said striker and latch assembly along a path which extends through an axis about which said keeper pivots to thereby retain the door against movement relative to the housing while minimizing any tendency for the force transmitted between said striker and latch assembly to pivot said keeper from the first position to the second position,* said retainer surface means includes an arcuate surface which is engaged by said striker when said keeper is in the first position, said arcuate surface having a center of curvature which is disposed on the axis about which said keeper pivots when said keeper is in the first position.

15. An assembly as set forth in claim 14 wherein said means includes an arm having a first portion which is connected to said keeper and a second portion which is supported for pivotal movement, said arcuate surface being disposed on said second portion of said arm.

16. An assembly as set forth in claim 14 wherein the center of curvature of said arcuate surface is disposed on the axis about which said keeper pivots when said keeper is in the second position.

17. An assembly [set forth in claim 13 wherein] *for retaining a door against movement relative to a housing, said assembly comprising a striker connected with the door for movement therewith relative to the housing, and a latch assembly connected with the housing for holding the striker and door against movement relative to the housing and for releasing the striker and door for movement relative to the housing, said latch assembly including a permanent magnet fixedly connected with the housing, a pole piece fixedly connected with said permanent magnet to provide a flow path for magnetic flux, a coil extending around at least a portion of said pole piece, a keeper, mounting means for*

*mounting said keeper for pivotal movement relative to said permanent magnet and pole piece between a first position in which said keeper engages said pole piece and a second position in which said keeper is spaced from said pole piece, said permanent magnet being effective to retain said keeper in the first position, said coil being energizable to oppose said permanent magnet and release said keeper for pivotal movement from the first position to the second position, and retainer surface means connected with said keeper for retaining said striker when said keeper is in the first position, said striker including striker surface means for cooperating with said retainer surface means when said keeper is in the first position to transmit force between said striker and latch assembly along a path which extends through an axis about which said keeper pivots to thereby retain the door against movement relative to the housing while minimizing any tendency for the force transmitted between said striker and latch assembly to pivot said keeper from the first position to the second position,* said retainer surface means defines an open ended recess in which at least a portion of said striker is disposed when said keeper is in the first position to enable said retainer surface means to retain the door against movement relative to the housing, the a about which said keeper pivots between the first and second positions extending through the portion of said striker disposed in the recess when said keeper is in the first position.

[18. An assembly as set forth in claim 13 wherein sad retainer surface means at least partially defines a recess having an open end portion, said open end portion of said recess facing in a first direction when said keeper is in the first position, said open end portion of the recess facing toward the door in a second direction which is offset from the first direction when said keeper is in the second position, said striker being engagable with the recess when said keeper is in the first position.]

19. An assembly [as set forth in claim 18 wherein] *for retaining a door against movement relative to a housing, said assembly comprising a striker connected with the door for movement therewith relative to the housing, and a latch assembly connected with the housing for holding the striker and door against movement relative to the housing and for releasing the striker and door for movement relative to the housing, said latch assembly including a permanent magnet fixedly connected with the housing, a pole piece fixedly connected with said permanent magnet to provide a flow path for magnetic flux, a coil extending around at least a portion of said pole piece, a keeper, mounting means for mounting said keeper for pivotal movement relative to said permanent magnet and pole piece between a first position in which said keeper engages said pole piece and a second position in which said keeper is spaced from said pole piece, said permanent magnet being effective to retain said keeper in the first position, said coil being energizable to oppose said permanent magnet and release said keeper for pivotal movement from the first position to the second position, and retainer surface means connected with said keeper for retaining said striker when said keeper is in the first position, said striker including striker surface means for cooperating with said retainer surface means when said keeper is in the first position to transmit force between said striker and latch assembly along a path which extends through an axis about which said keeper pivots to thereby retain the door against movement relative to the housing while minimizing any tendency for the force transmitted between said striker and latch assembly to pivot said keeper from the first position to the second position,* the axis about which said keeper pivots extends through the recess when said keeper is in the first position.

*20. An assembly for retaining a door against movement relative to a housing, said assembly comprising a striker connected with the door for movement therewith relative to the housing, and a latch assembly connected with the housing for holding the striker and door against movement relative to the housing and for releasing the striker and door for movement relative to the housing, said latch assembly including a permanent magnet fixedly connected with the housing, a pole piece fixedly connected with said permanent magnet to provide a flow path for magnetic flux, a coil extending around at least a portion of said pole piece, a keeper, mounting means for mounting said keeper for pivotal movement relative to said permanent magnet and pole piece between a first position in which said keeper engages said pole piece and a second position in which said keeper is spaced from said pole piece, said permanent magnet being effective to retain said keeper in the first position, said coil being energizable to oppose said permanent magnet and release said keeper for pivotal movement from the first position to the second position, and a retainer surface connected with said keeper for pivotal movement therewith relative to said permanent magnet and pole piece, said retainer surface being pivotal with said keeper between a retaining position in which said retainer surface retains said striker against movement relative to the housing to thereby retain the door against movement relative to the housing and a release position in which said retainer surface is ineffective to retain said striker against movement relative to the housing to thereby release the door for movement relative to the housing, said retainer surface being disposed in the retaining position when said keeper is in the first position and being disposed in the release position when said keeper is in the second position, said retainer surface at least partially defines a recess having an open end portion, said open end portion of said recess facing in a first direction when said keeper is in the first position, said open end portion of the recess facing toward the door in a second direction which is offset from the first direction when said keeper is in the second position, said striker being engaged by the recess when said keeper is in the first position and said open end portion of the recess faces in the first direction to retain the door in a predetermined position relative to the housing, said retainer surface being ineffective to retain said striker in the recess when said open end portion of the recess faces in the second direction, said mounting means includes an arm connected with said keeper and first and second support means disposed adjacent to said arm for supporting said arm for pivotal movement, said retainer surface being connected with said arm and disposed between said first and second support means.*

*21. An assembly for retaining a door against movement relative to a housing, said assembly comprising a striker connected with the door for movement therewith relative to the housing, and a latch assembly connected with the housing for holding the striker and door against movement relative to the housing and for releasing the striker and door for movement relative to the housing, said latch assembly including a permanent magnet fixedly connected with the housing, a pole piece fixedly connected with said permanent magnet to provide a flow path for magnetic flux, a coil extending around at least a portion of said pole piece, a keeper, mounting means for mounting said keeper for pivotal movement relative to said permanent magnet and pole piece between a first position in which said keeper engages said pole piece and a second position in which said keeper is*

*spaced from said pole piece, said permanent magnet being effective to retain said keeper in the first position, said coil being energizable to oppose said permanent magnet and release said keeper for pivotal movement from the first position to the second position, and a retainer surface connected with said keeper for pivotal movement therewith relative to said permanent magnet and pole piece, said retainer surface being pivotal with said keeper between a retaining position in which said retainer surface retains said striker against movement relative to the housing to thereby retain the door against movement relative to the housing and a release position in which said retainer surface is ineffective to retain said striker against movement relative to the housing to thereby release the door for movement relative to the housing, said retainer surface being disposed in the retaining position when said keeper is in the first position and being disposed in the release position when said keeper is in the second position, said retainer surface includes an arcuate surface which is engaged by said striker when said keeper is in the first position, said arcuate surface having a center of curvature which is disposed on an axis about which said keeper pivots when said keeper is in the first position.*

*22. An assembly as set forth in claim 21 wherein said mounting means includes an arm having a first portion which is connected to said keeper and a second portion which is supported for pivotal movement, said arcuate surface being disposed on said second portion of said arm.*

*23. An assembly as set forth in claim 21 wherein the center of curvature of said arcuate surface is disposed on the axis about which said keeper pivots when said keeper is in the second position.*

* * * * *

UNITED STATES PATENT AND TRADEMARK OFFICE

CERTIFICATE OF CORRECTION

PATENT NO. : Re. 36,652
DATED : April 11, 2000
INVENTOR(S) : William S. Wang

It is certified that error appears in the above-indentified patent and that said Letters Patent is hereby corrected as shown below:

Column 10, line 38, change "sad" to --said--

Column 10, line 61, change "or" to --of--

Column 13, line 24, change "a" to --axis--

Signed and Sealed this

Twenty-seventh Day of March, 2001

*Attest:*

Nicholas P. Godici

NICHOLAS P. GODICI

*Attesting Officer*

*Acting Director of the United States Patent and Trademark Office*